United States Patent

Taguchi et al.

Patent Number: 5,189,533
Date of Patent: Feb. 23, 1993

[54] APPARATUS FOR OPTICALLY READING INFORMATION

[75] Inventors: Masahiro Taguchi, Aichi; Atsushi Hashikawa, Okazaki; Katsunori Goto, Handa, all of Japan

[73] Assignees: Nippondenso Co., Ltd., Kariya; Nippon Soken, Inc., Nishio, both of Japan

[21] Appl. No.: 678,595

[22] Filed: Apr. 1, 1991

[30] Foreign Application Priority Data

Mar. 30, 1990 [JP] Japan .................................. 2-85262

[51] Int. Cl.$^5$ .............................................. G02B 5/32
[52] U.S. Cl. .................................... 359/18; 359/17; 359/212; 359/216
[58] Field of Search .................. 359/17, 18, 209, 212, 359/216

[56] References Cited

U.S. PATENT DOCUMENTS

| | | | |
|---|---|---|---|
| 4,415,224 | 4/1983 | Dickson | 359/18 |
| 4,639,070 | 1/1987 | Ikeda et al. | |
| 4,655,541 | 4/1987 | Yamazaki et al. | |
| 4,971,410 | 11/1990 | Wike, Jr. et al. | 359/17 |

FOREIGN PATENT DOCUMENTS

| | | | |
|---|---|---|---|
| 60-252317 | 12/1985 | Japan | 359/18 |
| 62-205311 | 9/1987 | Japan | 359/18 |
| 1-214816 | 8/1989 | Japan | |

Primary Examiner—Bruce Y. Arnold
Assistant Examiner—J. P. Ryan
Attorney, Agent, or Firm—Cushman, Darby & Cushman

[57] ABSTRACT

An optical information reading apparatus for optically reading information recorded on a recording medium with a laser light beam emitted from a light source. The apparatus comprises a hologram device for receiving at its center portion a laser light beam. The hologram diffracts the received light so as to produce a first diffracted light beam and is arranged to receive at its entire surface light to be reflected from the recording medium and to diffract the received light so as to produce a second diffracted light beam. This hologram device is arranged to be driven by a motor so as to move the first diffracted light beam for a scanning operation. Also included in the reading apparatus is a reflection assembly for reflecting the first diffracted light beam from the hologram device toward the recording medium and further for reflecting light reflected from the recording medium toward substantially the entire surface of the hologram device whereby the hologram device produces the second diffracted light beam. The second diffracted light beam is directed to a light-receiving device which in turn performs a photoelectric conversion in accordance with the intensity of the received light beam to read the information recorded on the recording medium. This arrangement allows the size-reduction of the apparatus concurrently with accurately reading out the information.

34 Claims, 6 Drawing Sheets

APPARATUS FOR OPTICALLY READING INFORMATION

BACKGROUND OF THE INVENTION

The present invention relates to apparatus for optically reading information such as bar code through a hologram device.

One known optical information reading technique (bar code reader or image scanner) involves optically reading information through a reflection type hologram device or a transmission type hologram device such as described in the Japanese Patent Provisional Publication No. 1-142523. FIG. 1 is an illustration of a conventional bar code reader using a reflection type hologram device. In FIG. 1, a light beam emitted from a light source 11 is condensed through a lens 14 to produce a condensed light beam 11a which in turn, passes through a hole of a mirror 14 to reach a reflection type hologram device 13 comprising a plurality of hologram elements 13a, then reflected and diffracted thereon so as to produce a reflected and diffracted light beam 11b to be directed to a bar code 17. At this time, a motor 12 is driven so as to rotate the reflection type hologram device 13, whereby the bar code 17 is scanned with the reflected and diffracted light beam 11b. On the other hand, a reflected light beam 17a from the bar code 17 is incident on the hologram element 13a, thereafter again reflected, diffracted and condensed thereat to be directed to the mirror 15. The light reflected on the mirror 15 is led to a light-receiving device 16. The light-receiving device 16 photoelectrically converts the received light into an electric signal which is led to a decoder circuit, not shown, to decode the optical information corresponding to the bar code 17.

There is a problem which arises with such an optical information reading apparatus, however, in that for the reception of the reflected light from the bar code 17 the light-reception surface of the hologram device 13 is required to be relatively wide. That is, the reflected light from the bar code 17 is scattered light and is spread out when led to the hologram device 13. Thus, for obtaining the minimum optical intensity necessary to accurately read out the bar code information, the hologram device 13 is required to have a relatively wide light-reception area. That is, this causes enlargement of the diameter of the hologram device 13 because the hologram device 13 is composed of a plurality of hologram elements 13a. The excessive enlargement of the diameter of the hologram device 13 increases the inertial mass of the hologram device 13 in response to rotation itself, thereby deteriorating the rotation rising characteristic and the anti-vibration characteristic. As a result, there is the possibility that difficulty is encountered in ensuring the accurate communication of the reflected light from the bar code to the light-receiving device 16 and hence to accurately read out the bar code information. In addition, for the aforementioned problems, one possible solution is to enlarge the diameter of the motor 12. However, this solution causes size-enlargement of the motor 12 and hence the enlargement of the apparatus so as to raise the manufacturing cost of the apparatus.

SUMMARY OF THE INVENTION

It is therefore an object of the invention to provide an optical information reading apparatus which is capable of receiving the reflected light from the optical recording medium with the entire surface of the hologram device so as to permit the size-reduction of the hologram device concurrently with accurately reading out the optical information.

With this object and other features which will become apparent as the description proceeds, the apparatus comprises a hologram device for receiving at its center portion the laser light beam emitted therefrom to diffract the received light so as to produce a first diffracted light beam and further for receiving at its entire surface light to be reflected from the recording medium to diffract the received light so as to produce a second diffracted light beam. This hologram device is arranged to be driven by a motor so as to move the first diffracted light beam for a scanning operation. Also included in the reading apparatus is a reflection assembly for reflecting the first diffracted light beam from the hologram device toward the recording medium and further for reflecting light reflected from the recording medium toward the substantial entire surface of the hologram device whereby the hologram device produces the second diffracted light beam. The second diffracted light beam is directed to a light-receiving device which in turn performs the photoelectric conversion in accordance with the intensity of the received light beam to read the information recorded on the recording medium. This arrangement allows the size-reduction of the apparatus concurrently with accurately reading out the information.

Further, according to this invention, the apparatus comprises hologram means rotatable about its own axis and arranged to receive substantially at its center of rotation portion, the light emitted from a light source to reflect and diffract the received light so as to produce conically-movable first diffracted light and further for receiving at its entire light-receiving area light from the recording medium. A drive means rotationally drives the hologram means about the rotational axis so as to conically move the diffracted light for scanning the recording medium. Also included in the apparatus is reflection means for reflecting the first conically moved diffraction light from the hologram means toward the recording medium and further for reflecting light reflected from the recording medium toward the entire light-receiving area of the hologram means whereby the hologram means produces second diffracted light.

Preferably, the hologram means is composed of a reflection type hologram element placed on a glass-made substrate, and fixedly secured onto a surface of the drive means, the drive means being arranged to be rotatable along a reflection surface of the reflection type hologram element. The reflection means comprises a plurality of reflection mirrors which are arranged to form a substantially trapezoidal configuration, and one of the plurality of reflection mirrors has a through-hole though which the light emitted from the light source means passes to reach the light-source side reflection mirror. The apparatus further comprises light-receiving means responsive to the second diffracted light beam from the hologram means so as to convert the diffracted light into an electrical signal, and the rotational axis of the hologram means is arranged to be in coaxial relation to a center point of the light-receiving means. Further, it is also appropriate that the hologram means comprises a transmission type hologram element placed on a glass-made substrate, and the drive means has at its center portion a hollow rotation shaft whereby the light emitted from the light source passes through a hollow of the hollow rotation shaft to reach the transmission type hologram element so as to be diffracted to produce the first diffracted light.

In accordance with the present invention, there is provided an optical information reading apparatus for optically reading information recorded on a recording medium, comprising: light source means for emitting light; mirror means rotatable and arranged to receive the light emitted from the light source to reflect the received light so as to produce reflected light; drive means for rotationally driving the mirror means so as to move the reflected light for scanning the recording medium; reflected means for reflecting the reflection light from the mirror means toward the recording medium and further for reflecting light reflected from the recording medium; hologram means for diffracting the reflected light of the reflection means indicative of the information on the recording medium so as to produce diffracted light; and light-receiving means for receiving the diffracted light from the hologram means to read the information on the recording medium.

In accordance with this invention, there is further provided an optical information reading apparatus for optically reading information recorded on a recording medium, comprising: light source means for emitting light; mirror means rotatable and arranged to receive the light emitted from the light source to reflect the received light so as to produce reflected light; drive means for rotationally driving the mirror means so as to move the reflected light for scanning the recording medium; reflected means for reflecting the reflection light from the mirror means toward the recording medium and further for reflecting light reflected from said recording medium; Fresnel reflection mirror means for reflecting the reflected light of the reflection means indicative of the information on the recording medium; and light-receiving means for receiving the light from the hologram means to read the information on the recording medium.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
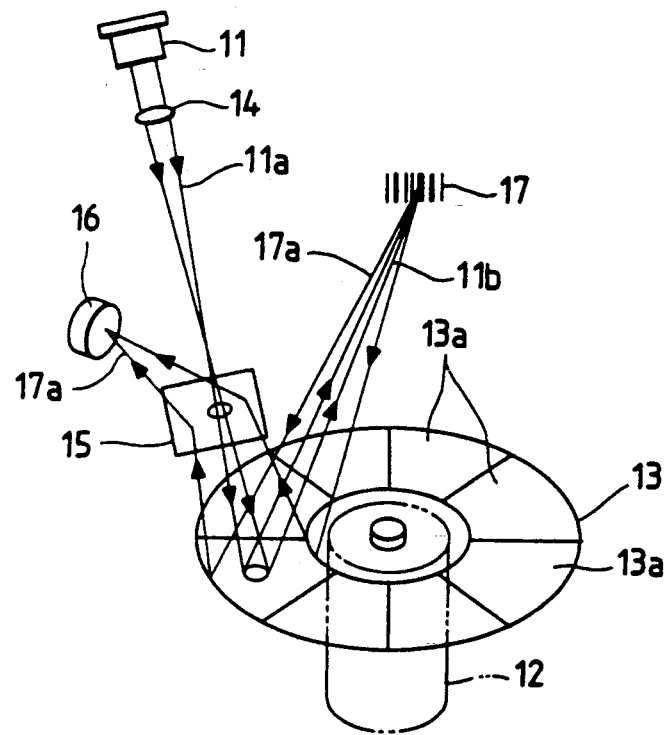
FIG. 1 is an illustration for describing an arrangement of a conventional optical information reading apparatus.
Figure 2:
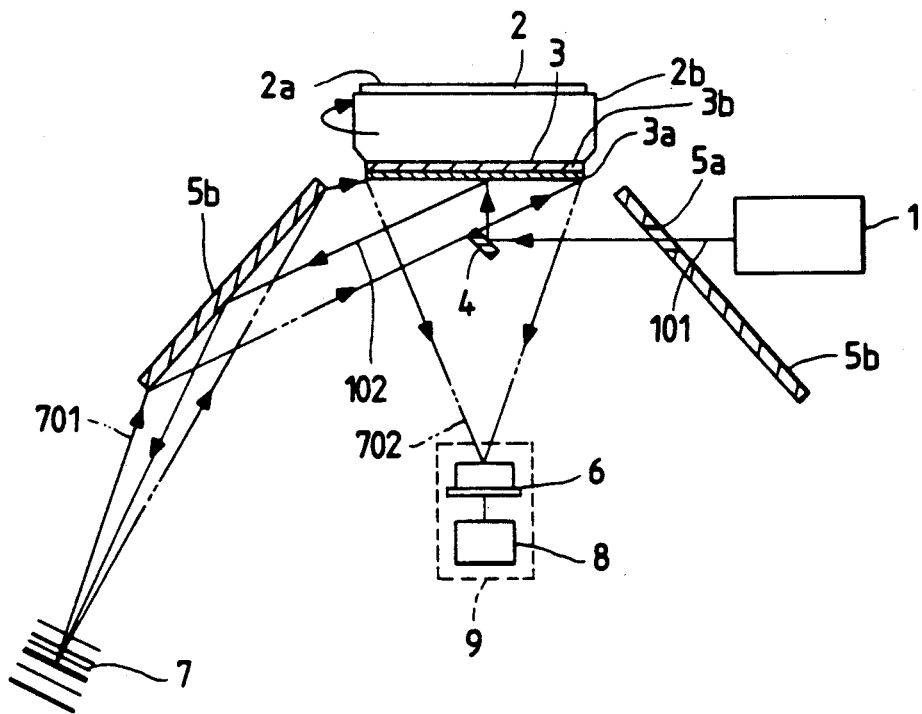
FIG. 2 is an illustration of an arrangement of a reflection type optical information reading apparatus according to a first embodiment of the present invention.
Figure 3:
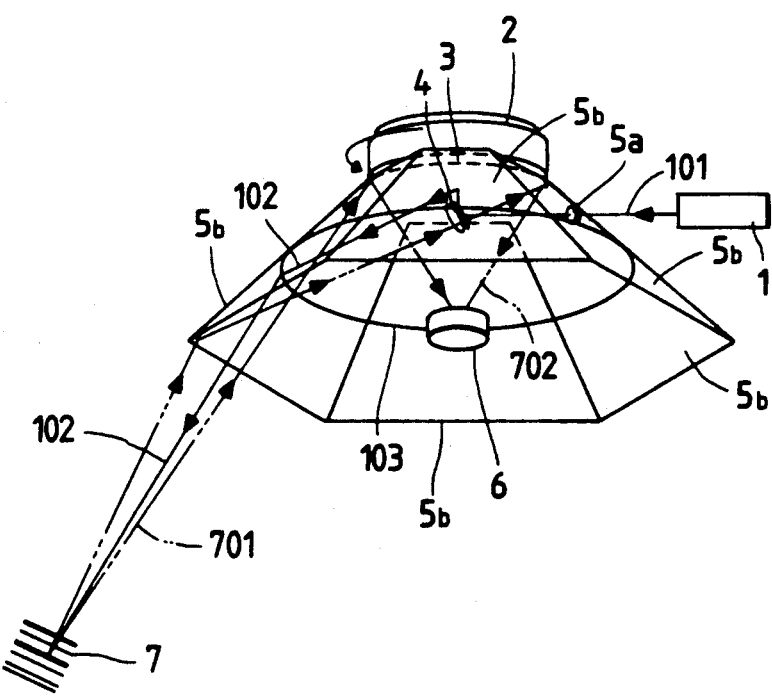
FIG. 3 is a perspective view of the reading apparatus of the first embodiment.
Figure 4:
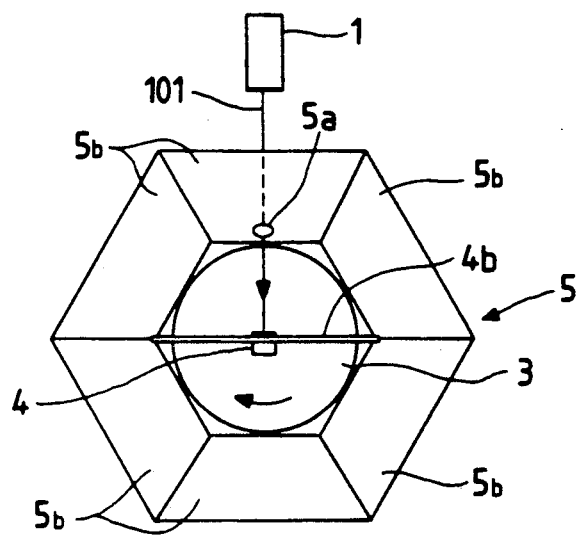
FIG. 4 is a plan view showing the same reading apparatus.

Referring now to FIG. 2, there is illustrated an optical information reading apparatus according to a first embodiment of the present invention. FIG. 3 is a perspective view of the optical information reading apparatus and FIG. 4 is a plan view of the same reading apparatus. The description thereof will be made in the case of using a reflection type hologram device. In FIG. 2, illustrated at numeral 3 is a hologram device comprising a reflection hologram element 3a, a glass-made (for example) substrate 3b, and, if required, a cover glass (not shown) for covering the reflection hologram element 3a. The reflection hologram element 3a is disposed so as to condense reflected light 701 from an optical information recording medium (a bar code) 7 to a light-receiving device 6 which will be described hereinafter. Illustrated at numeral 2 is a drive means which is an outer rotor type motor whose inner side 2a is fixed and outer side 2b is rotatable clockwise as indicated by an arrow in FIG. 2. The hologram device 3 is fixedly secured through an adhesive or the like to the outer side 2b of the motor 2.

Figure 5:
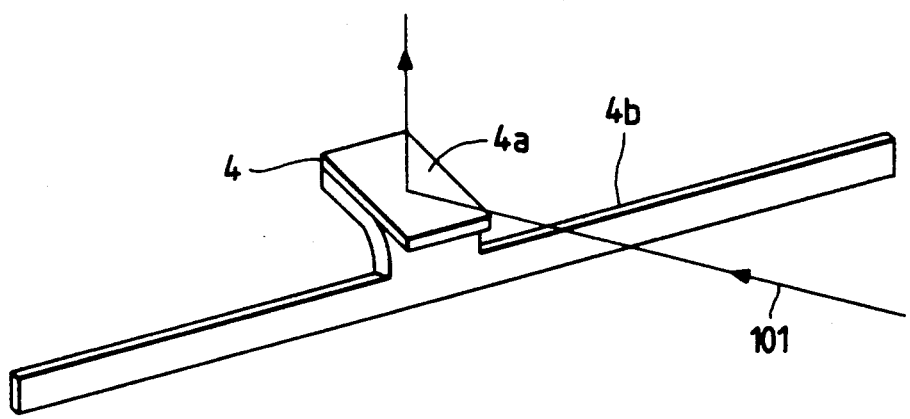
FIG. 5 shows an arrangement of a light-source reflection mirror to be used in the first embodiment.

As a light source there is used a laser light projector 1 which is arranged so as to emit a laser light beam 101. The laser light beam 101 emitted from the laser light projector 1 is directed to a reflection mirror 4 for the light source so as to reach the hologram device 3. As illustrated in FIG. 5, the reflection mirror 4 is composed of a light-source reflection mirror 4a and a fixing member 4b, and the light-source mirror 4a is fixedly secured through an adhesive or the like to the fixing member 4b so that the laser light beam 101 emitted from the laser light projector 1 is vertically incident on the center of rotation of the hologram device 3. Further, the reflection mirror 4 is fixedly secured to a connecting portion of a reflection means (reflection mirror) 5 as shown in FIG. 4. Here, the light-source mirror 4a is disposed at an angle whereby the laser light beam 101 from the laser light projector 1 is vertically incident on the rotational axis (center) of the hologram device 3.

The reflection means 5 has a polygonal trapezoid configuration as illustrated in FIG. 3 and comprises a plurality of reflection mirrors 5b (six mirrors in FIG. 3) to be joined with each other so as to form the polygonal trapezoid configuration. At this time, the respective reflection mirrors 5b are disposed so that multi-direction scanning is effected at a predetermined position with conically scanning light due to the hologram device 3. One of the plurality of reflection mirrors 5b is equipped with a through-hole 5a whereby the laser light beam 101 from the laser light projector 1 is directly directed to the light-source reflection mirror 4.

A reading means 9 is composed of a light-receiving element (for example, a photodiode) 6 for performing the photoelectric conversion of the received light and a data conversion circuit (for example, a decoder circuit) 8. The reading means 9 is fixedly secured to a POS or the like, not shown. The light-receiving element 6 is disposed such that its center has an coaxial relation to the rotation axis of the hologram device 3.

Secondly, operation of the above-described arrangement will be described hereinbelow with reference to FIGS. 2 and 3. In FIG. 2, the laser light beam emitted from the laser light projector 1 passes through the through-hole 5a of the reflection mirror 5b to reach the light-source reflection mirror 4. The laser light beam 101 reflected on the light-source mirror 4 is vertically incident on the hologram device 3, then reflected and diffracted by the reflection hologram element 3a making up the hologram device 3 so as to become diffracted light 102. This diffracted light 102 is reflected by means of the reflection mirror 5b of the reflection means 5 so as to arrive at the bar code 7. Here, the laser light beam 101 from the laser light projector 1 which is reflected by the light-source reflection mirror 4 is vertically incident on the center of rotation of the hologram device 3. Further, the laser light beam 101 incident on the rotational center of the hologram device 3 is reflected and diffracted so as to become diffracted light 102, and the diffracting direction of the diffracted light 102 is fixed by the reflection hologram element 3a which is presented at the rotational center of the hologram device 3. That is, the reflection hologram element 3a is disposed so that the reflected light 701 is condensed to the light-receiving element 6, and the center of the light-receiving device 6 is disposed to be in coaxial relation to the rotational axis of the hologram device 3.

The reflected light to be incident on the rotational axis (center) of the hologram device 3 is vertically reflected with respect to the hologram device 3 and further diffracted so as to be directed to the light-receiving device 6. Accordingly, if light (laser light 101) is vertically incident on the rotational axis of the hologram device 3, it is reflected and diffracted to become diffracted light whereby the diffracting direction of the diffracted light 102 can be fixed. Thus, in response to rotation of the motor 2, the hologram device rotates so that the diffracted light 102 is conically scanned as indicated by a scanning line 103 in FIG. 3 whereby the diffracted light 102 is scanned in multiple directions by means of the reflection means 5.

In FIG. 2, with the above-described operation, the bar code 7 is scanned with the diffracted light 102. This scanning allows generation of the reflected light 701 from the bar code 7 which is in turn directed through the reflected means 5 to the hologram device 3. The reflection light 701 is incident on the entire surface of the hologram device 3 and then reflected and diffracted on the reflection hologram element 3a so as to become reflected and diffracted light 702. Here, the reflection hologram element 3a is arranged so that the reflected and diffracted light 702 is condensed onto the light-receiving device 6.

When the reflected and diffracted light 702 is condensed on the light-receiving device 6, the light-receiving device 6 performs the photoelectric conversion in accordance with the intensity of the condensed light. Here, although a portion of the reflected and diffracted light 702 is not condensed on the light-receiving device 6 because the light-source reflection mirror 4 is an obstacle, the light-receiving area of the hologram device 3 is considerably larger than the area of the light-source reflection mirror 4 which obstructs the reflected and diffracted light 702, and therefore this does not affect the intensity of the reflected and diffracted light 702.

An electrical signal outputted from the light-receiving device 6 is supplied through the data conversion circuit 8 to the POS, not shown, whereby the information of the bar code 7 is decoded.

Figure 6:
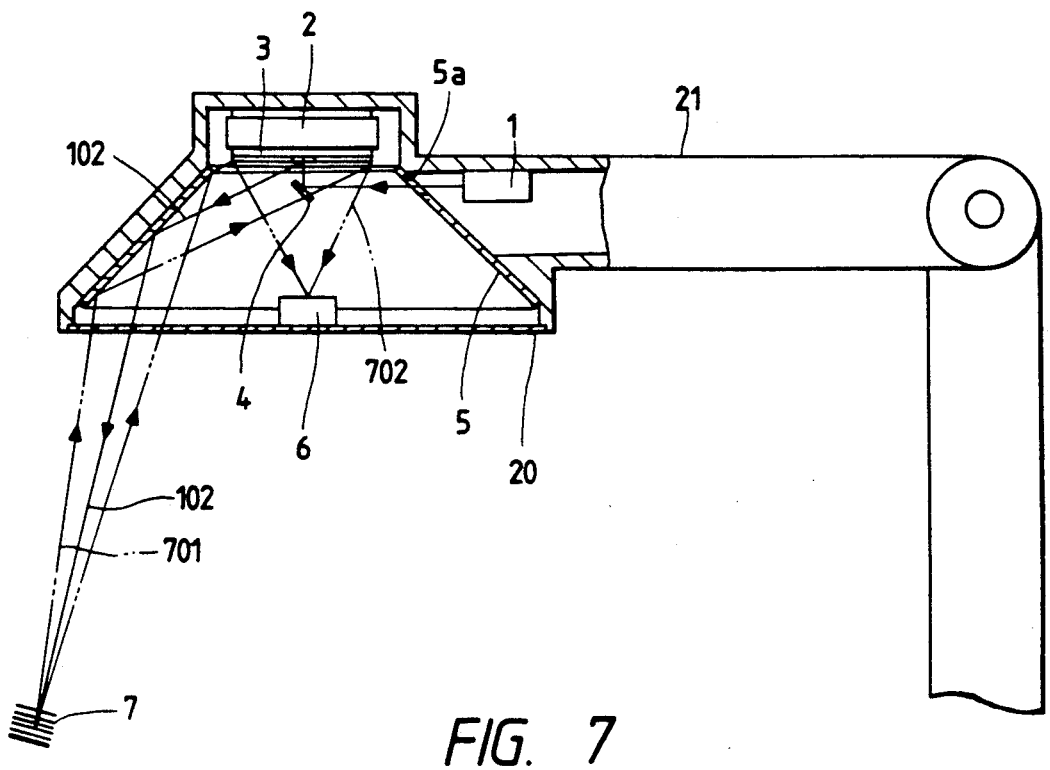
FIG. 6 is a cross-sectional view showing a system into which the reading apparatus of the first embodiment is incorporated.

FIG. 6 is a schematic illustration of the optical information reading apparatus of the first embodiment which is incorporated into an appropriate overhead type system. In FIG. 6, under the light-receiving device 6 there is provided a transparent glass member 20 through which the diffracted light 102 or the reflected light 701 passes. The hologram device 3, motor 2 and reflection means 5 are respectively supported by a supporting member 21.

According to this embodiment, the light intensity corresponding to the bar code information can be obtained through the reflection means 5 and further the reflection means 5 reflects the light 701 with the light intensity toward the hologram device 3 whereby the hologram device 3 can obtain the light intensity corresponding to the bar code information. Therefore, a sufficient effect can be obtained if the hologram device 3 has only an area necessary for receiving the reflected light 701 to be reflected by means of the reflection means 5. In addition, since the light-receiving area can be taken with respect to the entire surface of the hologram device 3, it is possible to considerably reduce the size of the apparatus. Further, the size-reduction of the hologram device 3 allows elimination of the deterioration of the rotation rising characteristic and anti-vibration characteristic.

Moreover, since the reflection hologram element 3a making up the hologram device 3 is disposed so that the reflected light 701 from the reflection means 5 is condensed on the light-receiving device 6, the condensing optical systems such as lens and mirror with a through-hole are not required, thereby shortening the distance between the hologram device 3 and the light-receiving device 6. This allows the light-receiving device 6 to be provided in the inside space of the reflection means 5 so as to reduce the thickness of the optical system of the optical information reading apparatus.

Figure 7:
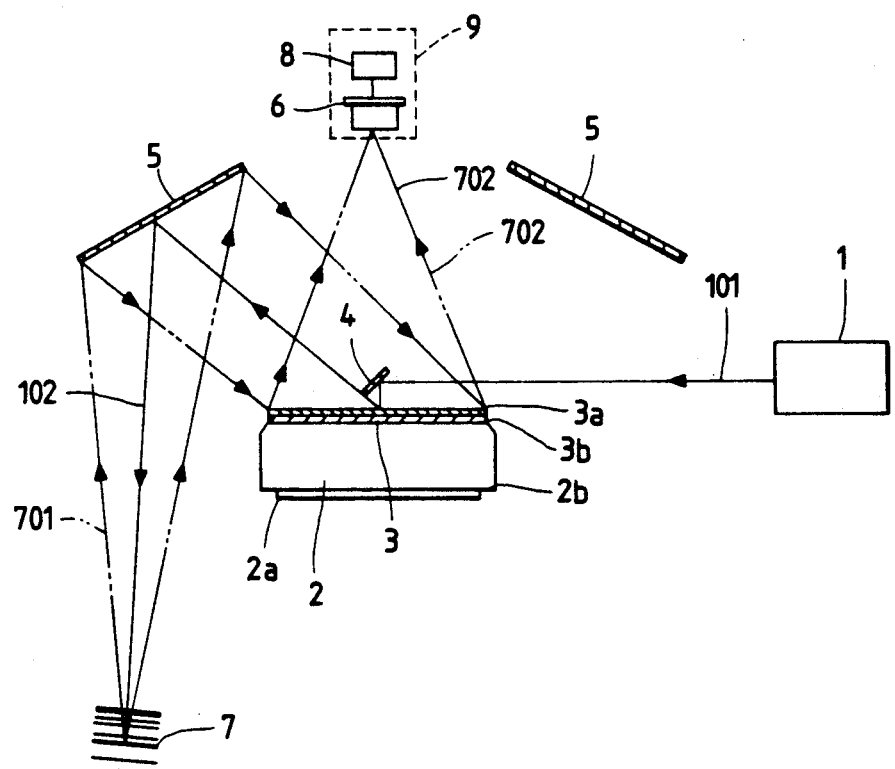
FIG. 7 illustrates a modification of the first embodiment.

FIG. 7 is an illustration of a modification of the above-described first embodiment. One difference therebetween is that the reading means 9, the hologram device 3 and the motor 2 are reversely disposed as compared with the positions thereof illustrated in FIG. 2, and the bar code 7 is placed at the rear side of the reflection and diffracted surface of the reflection hologram element 3a.

Figure 8:
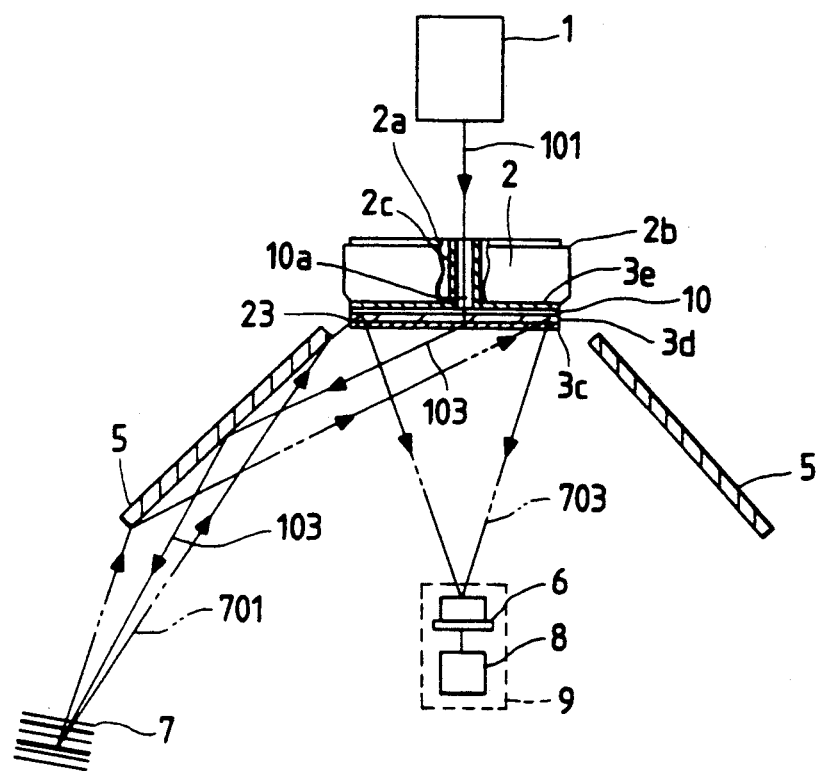
FIG. 8 is an illustration of a transmission type optical information reading apparatus according to a second embodiment of this invention.

Secondly, a description will be made hereinbelow with reference to FIG. 8 in terms of an optical information reading apparatus with a transmission type hologram according to a second embodiment of this invention where parts corresponding to those in FIG. 2 are marked with the same reference numerals. In FIG. 8, illustrated at numeral 23 is a hologram device comprising a transmission type hologram element 3c and a glass-made (for example) substrate 3d. As well as the reflection type hologram element 3a in FIG. 2, this transmission type hologram element 3c is arranged so that reflected light 701 from a bar code 7 is condensed onto a light-receiving device 6. Between the hologram device 23 and the outer side 2b of a motor 2 there is provided a member 3e having thereon a reflection film 10 by means of the deposition technique. The member 3e is fixedly secured to the outer side 2b of the motor 2 through an adhesive, and a through-hole 10a is formed at the center portion of the member 3e so as to be communicated with a hollow shaft 2c which will be described hereinafter. The above-mentioned reflection deposition film 10 is not provided at the through-hole 10a. Further, in the center portion of the motor 2 there is provided the hollow shaft 2c whose hollow is communicated with the through-hole 10a of the member 2e. Illustrated at numeral 1 is a laser light projector which is arranged so that the laser light emitted therefrom passes through the hollow of the hollow shaft 2c.

Secondly, the operation of the apparatus thus arranged will be described hereinbelow. In FIG. 8, the laser light 101 emitted from the laser light projector 1 passes through the inside (hollow) of the hollow shaft 2c of the motor 2, further passing through the through-hole 10a of the member 3e and the substrate 3d so as to be diffracted when transmitting (passing through) the transmission type hologram element 3c, thereby obtaining diffracted light 103. The diffracted light 103 is reflected toward the bar code 7 by means of a reflection means (reflection mirror) 5. In response to rotation of the motor 2, the hologram device 23 also rotates whereby as well as in the first embodiment the diffracted light 103 is conically movable (scanned) so as to perform the multi-direction scanning operation by the aid of the reflection means 5.

With the above-described operation, the bar code 7 is scanned with the diffracted light 103. As a result, the reflected light 701 from the bar code 7 is reflected toward the hologram device 23 through the reflection means 5. The reflected light reflected by the reflection means 5 is incident on the entire surface of the hologram device 23. The reflected light 701 incident thereon is diffracted on transmission before passing through the substrate 3c so as to be reflected by the reflection deposition film 10. Thereafter, the reflected light from the reflection deposition again passes through the substrate 3c so as to be transmitted and diffracted through the transmission type hologram element 3c, thereby obtaining transmitted and diffracted light 703 which is in turn condensed onto the light-receiving device 6 for performing the photoelectric conversion in accordance with the intensity of the incident light. Here, when the reflected light 701 is transmitted and diffracted through the transmission type hologram element 3c and reflected by the reflection deposition film 10, since the reflection position film 10 is absent at the through-hole 10a portion, the reflected light 701 incident on the through-hole 10a portion is not reflected. However, the area of the through-hole 10a portion is considerably smaller than the reflection area of the reflection deposition film 10, and therefore the non-reflected fact does not affect the light intensity.

An electrical signal outputted from the light-receiving device 6 is supplied through a data conversion circuit 8 to a POS (not shown) which in turn, decodes the bar code 7 information.

Figure 9:
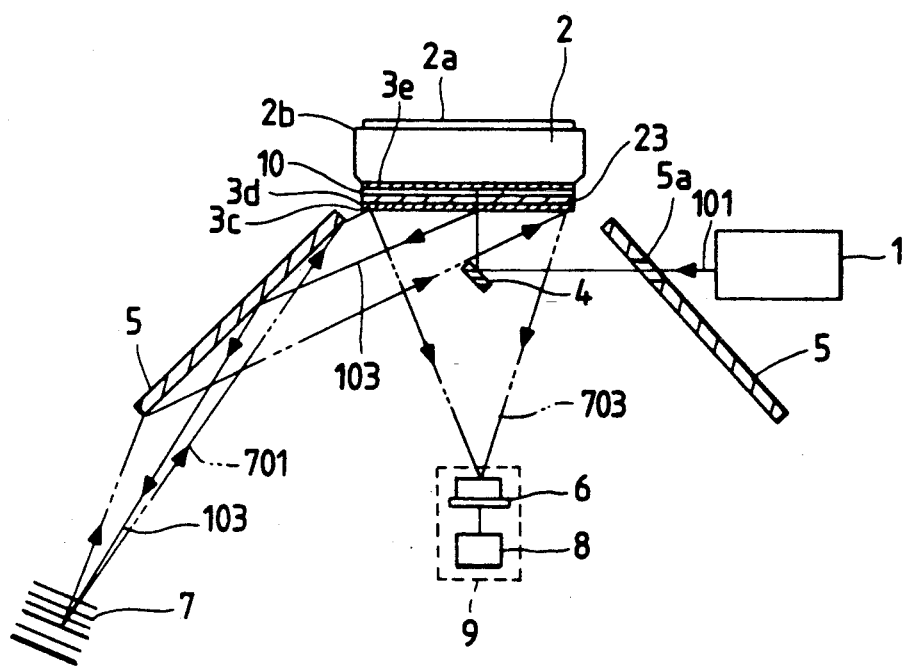
FIG. 9 shows a modification of the second embodiment.

FIG. 9 shows a modification of the above-described second embodiment. In comparison with the second embodiment illustrated in FIG. 8, the hollow shaft 2c and the through-hole 10a are not provided there, while the reflection deposition film 10 is disposed on the entire surface of the member 3e. That is, the hologram device 23 is replaced with the reflection type hologram device 3 as illustrated in FIG. 2. This arrangement can also offer the same effect as the above-mentioned second embodiment.

Figure 10:
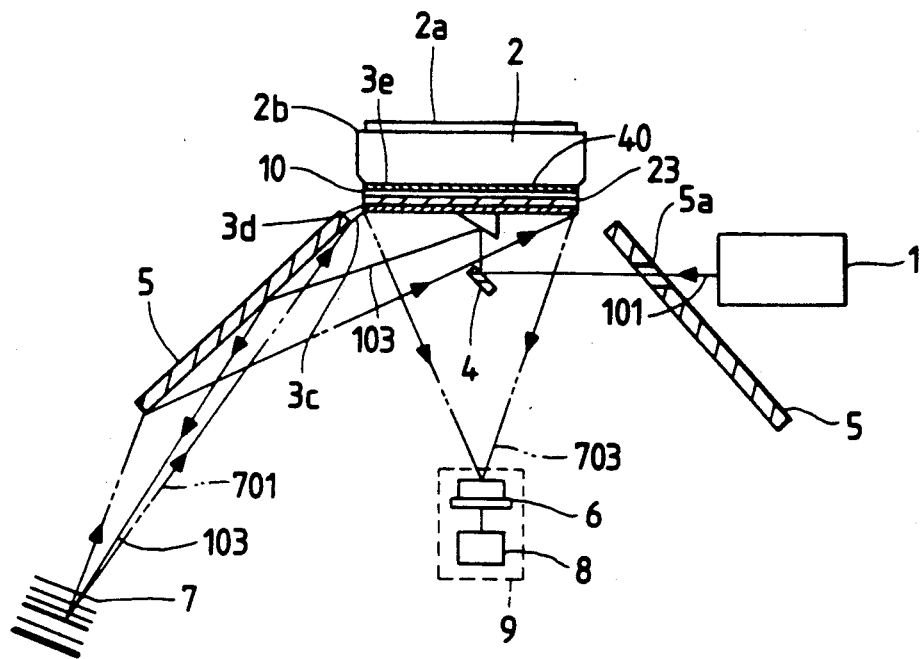
FIG. 10 is an illustration for describing an optical information reading apparatus according to a third embodiment of this invention.
Figure 11:
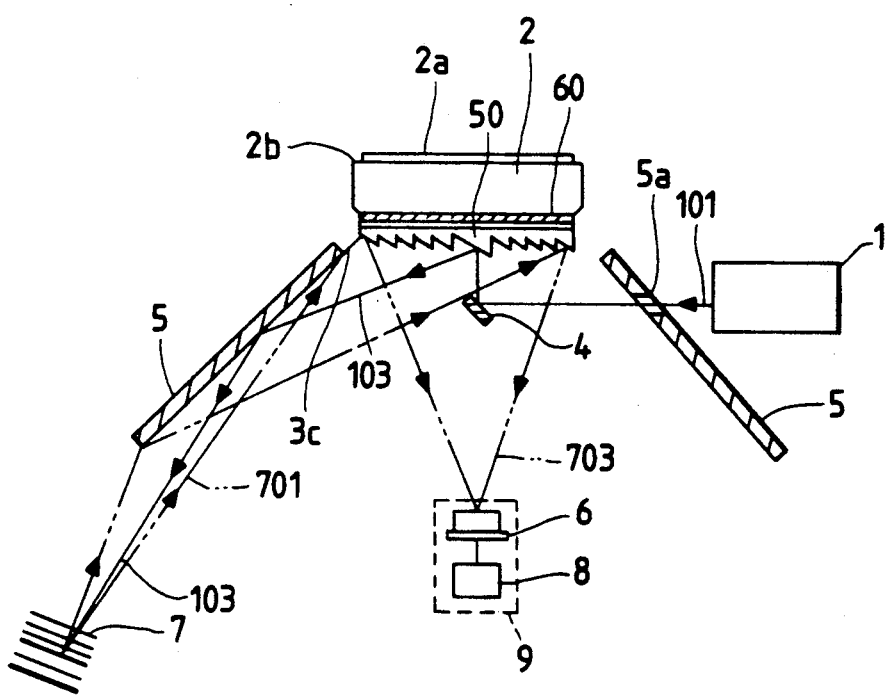
FIG. 11 is an illustration for describing an optical information reading apparatus according to a fourth embodiment of this invention.

FIGS. 10 and 11 are illustrations of third and fourth embodiments of this invention where parts corresponding to those in FIG. 2 or 8 are marked with the same reference numerals and the description thereof will be omitted for brevity. In the third embodiment, a scanning mirror 40 is provided at the center portion of the glass-made substrate 3d whereby the scanning light led from the laser light projector 1 through the light-source reflection mirror 4 is deflected so as to be directed through the reflection means 5 to the bar code 7. Further, in the fourth embodiments, a scanning mirror 50 is similarly provided so that the scanning light from the laser light projector 1 is led through the reflection means 5 to the bar code 7. In place of the hologram device 3 or 23, there is provided a Fresnel's reflection mirror having a function corresponding to the function of the hologram device whereby the reflection light 701 is reflected and condensed on the light-receiving device 6.

It should be understood that the foregoing relates to only preferred embodiments of the present invention, and that it is intended to cover all changes and modifications of the embodiments of this invention herein used for the purposes of the disclosure, which do not constitute departures from the spirit and scope of this invention.

What is claimed is:

1. An optical information reading apparatus for optically reading information recorded on a recording medium, comprising:

light source means for emitting light;

hologram means comprising a reflection type hologram element for receiving at substantially its center portion the light emitted from said light source to diffract the received light so as to produce first diffracted light and further for receiving at substantially its entire surface light from said recording medium to diffract the received light so as to produce second diffracted light;

drive means for driving said hologram means so as to move said first diffracted light for a scanning operation;

reflection means for reflecting said first diffracted light from said hologram means toward said recording medium and further for reflecting light reflected from said recording medium toward substantially the entire surface of said hologram means whereby said hologram means produces said second diffracted light; and light-receiving means for receiving said second diffracted light from said hologram means to read the information recorded on said recording medium.

2. An apparatus as claimed in claim 1, wherein said reflection type hologram element is placed on a glass-made substrate.

3. An apparatus as claimed in claim 2, wherein said hologram means is fixedly secured onto a surface of said drive means, said drive means being arranged to rotate a reflection surface of said reflection type hologram element.

4. An apparatus as claimed in claim 3, wherein a rotational axis of said hologram means is arranged to be in coaxial relation to a center point of said light-receiving means.

5. An apparatus as claimed in claim 1, wherein the light emitted from said light source means is vertically incident on said hologram means through a light-source side reflection mirror.

6. An apparatus as claimed in claim 5, wherein said reflection means comprises a plurality of reflection mirrors which are arranged to form a substantially trapezoidal configuration, and one of said plurality of reflection mirrors has a through-hole through which the light emitted from said light source means passes to reach said light-source side reflection mirror.

7. An optical information reading apparatus for optically reading information recorded on a recording medium, comprising:
    light source means for emitting light;
    hologram means comprising a reflection type hologram element rotatable about its own axis and arranged to receive at substantially its center portion the light emitted from said light source to diffract the received light so as to produce first diffracted light and further for receiving at its entire light-receiving area light from said recording medium to diffract the received light so as to produce second diffracted light;
    drive means for rotationally driving said hologram means about the rotational axis so as to move said first diffracted light for scanning said recording medium;
    reflection means for reflecting said first diffracted light from said hologram means toward said recording medium and further for reflecting light reflected from said recording medium toward the entire light-receiving area of said hologram means whereby said hologram means produces said second diffracted light; and
    light-receiving means for receiving said second diffracted light from said hologram means to read the information recorded on said recording medium.

8. An apparatus as claimed in claim 7, wherein said reflection type hologram element is placed on a glass-made substrate.

9. An apparatus as claimed in claim 8, wherein said hologram means is fixedly secured onto a surface of said drive means, said drive means being arranged to rotate a reflection surface of said reflection type hologram element.

10. An apparatus as claimed in claim 9, wherein a rotational axis of said hologram means is arranged to be in coaxial relation to a center point of said light-receiving means.

11. An apparatus as claimed in claim 8, wherein the light emitted from said light source means is vertically incident on said hologram means through a light-source side reflection mirror.

12. An apparatus as claimed in claim 11, wherein said reflection means comprises a plurality of reflection mirrors which are arranged to form a substantially trapezoidal configuration, and one of said plurality of reflection mirrors has a through-hole through which the light emitted from said light source means passes to reach said light-source side reflection mirror.

13. An apparatus as claimed in claim 7, wherein said hologram means comprises a transmission type hologram element placed on a glass-made substrate, and said drive means has at its center portion a hollow rotation shaft whereby the light emitted from said light source passes through a hollow of said hollow rotation shaft to reach said transmission type hologram element so as to be diffracted to produce said first diffraction light.

14. An optical information reading apparatus for optically reading information recorded on a recording medium, comprising:
    light source means for emitting light;
    hologram means comprising a reflection type hologram element rotatable about its own axis and arranged to receive at substantially its center of rotation portion the light emitted from said light source to reflect and diffract the received light so as to produce conically movable first diffracted light and further for receiving at its entire light-receiving area light from said recording medium to produce second diffracted light;
    drive means for rotationally driving said hologram means about the rotational axis so as to conically move said first diffracted light for scanning said recording medium; and
    reflection means for reflecting said first conically movable diffracted light from said hologram means toward said recording medium and further for reflecting light reflected from said recording medium toward the entire light-receiving area of said hologram means whereby said hologram means produces second diffracted light.

15. An apparatus as claimed in claim 14, wherein said reflection type hologram element is placed on a glass-made substrate.

16. An apparatus as claimed in claim 15, wherein the light emitted from said light source mean is vertically incident on said hologram means through a light-source side reflection mirror.

17. An apparatus as claimed in claim 16, wherein said reflection means comprises a plurality of reflection mirrors which are arranged to form a substantially trapezoidal configuration and one of said plurality of reflection mirrors has a through-hole through which the light emitted from said light source means passes to reach said light-source side reflection mirror.

18. An apparatus as claimed in claim 14, wherein said hologram means is fixedly secured onto a surface of said drive means, said drive means being arranged to rotate a reflection surface of said reflection type hologram element.

19. An apparatus as claimed in claim 18, further comprising light-receiving means responsive to the second diffracted light from said hologram means so as to convert the diffracted light into an electrical signal, and wherein a rotational axis of said hologram means is arranged to be in coaxial relation to a center point of said light-receiving means.

20. An optical information reading apparatus for optically reading information recorded on a recording medium, comprising:
    light source means for emitting light;
    mirror means rotatable and arranged to receive the light emitted from said light source to reflect the received light so as to produce reflected light;
    drive means for rotationally driving said mirror means so as to move said reflected light for scanning said recording medium;
    reflection means for reflecting said reflected light from said mirror means toward said recording medium and further for reflecting light reflected from said recording medium;
    hologram means for diffracting the reflected light of the reflection means indicative of the information on said recording medium so as to produce diffracted light; and
    light-receiving means for receiving said diffracted light from said hologram means to read the information on said recording medium.

21. An apparatus as claimed in claim 20, wherein said hologram means is composed of a reflection type hologram element placed on a glass-made substrate.

22. An apparatus as claimed in claim 21, wherein said hologram means is fixedly secured onto a surface of said drive means, said drive means being arranged to rotate a reflection surface of said reflection type hologram element.

23. An apparatus as claimed in claim 22, wherein a rotational axis of said hologram means is arranged to be in coaxial relation to a center point of said light-receiving means.

24. An apparatus as claimed in claim 21, wherein the light emitted from said light source means is vertically incident on said mirror means through a light-source side reflection mirror.

25. An apparatus as claimed in claim 24, wherein said reflection means comprises a plurality of reflection mirrors which are arranged to form a substantially trapezoidal configuration, and one of said plurality of reflection mirrors has a through-hole through which the light emitted from said light source means passes to reach said light-source side reflection mirror.

26. An apparatus as claimed in claim 20, wherein said mirror means is fixedly disposed at the center portion of said hologram means.

27. An optical information reading apparatus for optically reading information recorded on a recording medium, comprising:
   light source means for emitting light;
   mirror means rotatable and arranged to receive the light emitted from said light source to reflect the received light so as to produce reflected light;
   drive means for rotationally driving said mirror means so as to move said reflected light for scanning said recording medium;
   received means for reflecting said reflection light from said mirror means toward said recording medium and further for reflecting light reflected from said recording medium;
   Fresnel reflection mirror means for reflecting the reflected light of the reflection means indicative of the information on said recording medium; and
   light-receiving means for receiving said light from said hologram means to read the information on said recording medium.

28. An apparatus as claimed in claim 27, wherein said Fresnel reflection mirror means is fixedly secured onto a surface of said drive means.

29. An apparatus as claimed in claim 27, wherein the light emitted from said light source means is vertically incident on said mirror means through a light-source side reflection mirror.

30. An apparatus as claimed in claim 29, wherein said reflection means comprises a plurality of reflection mirrors which are arranged to form a substantially trapezoidal configuration, and one of said plurality of reflection mirrors has a through-hole through which the light emitted from said light source means passes to reach said light-source side reflection mirror.

31. An apparatus as claimed in claim 27, wherein a rotational axis of said Fresnel reflection mirror means is arranged to be in coaxial relation to a center point of said light-receiving means.

32. An apparatus as claimed in claim 27, wherein said mirror means is fixedly disposed at the center portion of said Fresnel reflection mirror means.

33. An optical information reading apparatus for optically reading information recorded on a recording medium, comprising:
   light source means for emitting light;
   hologram means comprising a transmission type hologram element rotatable about its own axis and arranged to receive at substantially its center of rotation portion the light emitted from said light source to reflect and diffract the received light so as to produce conically movable first diffracted light an further for receiving at its entire light receiving area light from said recording medium to produce second diffracted light;
   drive means for rotationally driving said hologram means about the rotational axis so as to conically move said diffracted light for scanning said recording medium, wherein the drive means has at its center portion a hollow rotation shaft, whereby the light emitted from said light source passes through said hollow rotation shaft to reach said transmission type hologram element so as to be diffracted to produce said first diffracted light; and
   reflection means for reflecting said first conically movable diffracted light from said hologram means towards said recording medium and further for reflecting light reflected from said recording medium toward the entire light receiving area of said hologram means whereby said hologram means produces second diffracted light.

34. An apparatus as claimed in claim 33, wherein said transmission type hologram element is placed on a glass substrate.

* * * * *